United States Patent
Levenick et al.

(10) Patent No.: US 9,390,594 B2
(45) Date of Patent: Jul. 12, 2016

(54) NOTE VALIDATOR SECURITY

(75) Inventors: Mark Levenick, Flower Mound, TX (US); Flynt Moreland, Plano, TX (US)

(73) Assignee: Tidel Engineering, L.P., Carrolton, TX (US)

(*) Notice: Subject to any disclaimer, the term of this patent is extended or adjusted under 35 U.S.C. 154(b) by 785 days.

(21) Appl. No.: 13/484,053

(22) Filed: May 30, 2012

(65) Prior Publication Data

US 2013/0082822 A1 Apr. 4, 2013

Related U.S. Application Data

(60) Provisional application No. 61/542,647, filed on Oct. 3, 2011.

(51) Int. Cl.
| | |
|---|---|
| *G05B 19/00* | (2006.01) |
| *G07F 19/00* | (2006.01) |
| *G06Q 20/10* | (2012.01) |

(52) U.S. Cl.
CPC .......... *G07F 19/202* (2013.01); *G06Q 20/1085* (2013.01); *G07F 19/209* (2013.01)

(58) Field of Classification Search
CPC ....... G07F 7/04; G07F 19/202; G07F 19/209; G07D 11/0006; G06Q 20/1085
USPC .......................... 340/5.73; 194/206, 217, 350
See application file for complete search history.

(56) References Cited

U.S. PATENT DOCUMENTS

| | | | | |
|---|---|---|---|---|
| 6,039,164 | A * | 3/2000 | Waters et al. | 194/206 |
| 6,983,836 | B2 | 1/2006 | Adams et al. | |
| 7,516,832 | B2 | 4/2009 | Dobbins | |
| 2005/0040005 | A1* | 2/2005 | Dobbins | 194/206 |
| 2010/0245043 | A1* | 9/2010 | Doi | G07D 11/0018 340/5.86 |
| 2010/0289208 | A1* | 11/2010 | Clauser | G07D 11/0018 271/34 |

OTHER PUBLICATIONS

MEI/Cashflow "Rising Bill Validator Performance Expectations", pp. 1-4 www.meigroup.com.
CSS Corporate Safe Specialists, FireKing Security Group, "Maximize Cash Flow" pp. 1-4 www.nklcashhandling.com.

* cited by examiner

*Primary Examiner* — Nabil Syed
(74) *Attorney, Agent, or Firm* — HolzerIPLaw, PC

(57) ABSTRACT

A smart safe include one or more note validators. Access to the note validators and internal workings of the smart safe is defined by an applicable level of security at the smart safe. The applicable level of security may be dependent on whether the smart safe is experiencing an error condition and/or the identification of a user trying to access the smart safe. By allowing some users limited access to the note validators, the users may be able to resolve some error conditions without compromising the integrity of notes stored within the smart safe and without relying on dedicated service personnel to resolve the error condition at the smart safe.

27 Claims, 6 Drawing Sheets

NOTE VALIDATOR SECURITY

CROSS-REFERENCE TO RELATED APPLICATIONS

The present application claims benefit of priority to U.S. Provisional Patent Application No. 61/542,647, entitled "Note Validator Security" and filed on 3 Oct. 2011, which is specifically incorporated by reference herein for all that it discloses or teaches.

BACKGROUND

Secure vaults with built-in note validators or currency detectors (i.e., devices that receive and determine if a bank note or piece of currency is, or is not counterfeit or other wise unacceptable) are referred to herein as smart safes. Smart safes are used by retailers to manage and secure currency and other notes received from customers. One aspect of smart safes is the ability of a bank to provide a potential borrower (e.g., a retail store operator or service provider) provisional credit based on the value of validated currency or other notes received and stored within the potential borrower's smart safe(s).

Occasionally a smart safe experiences an error condition that renders it inoperable. These error conditions can increase the downtime of the smart safe and often require a technician to physically come and repair the smart safe and/or revalidate the contents of the smart safe. This makes the smart safe more expensive to operate and less reliable in the field. Thus, minimizing smart safe downtime and service technician visits to the smart safe is desirable.

SUMMARY

Implementations described and claimed herein address the foregoing problems by providing a method of providing access to a note validator head comprising providing a first level of security to the note validator head using a processor; detecting a error condition at the note validator head; and providing a second level of security to the note validator head using the processor responsive to detecting the error condition, wherein the second level of security is different than the first level of security.

Implementations described and claimed herein further address the foregoing problems by providing a smart safe comprising: a note validator including a note validator head; a computer that provides a first level of security to the note validator head; and detection circuitry that detects a error condition at the note validator head, wherein the computer provides a second level of security to the note validator head responsive to detecting the error condition, wherein the second level of security is different than the first level of security.

Other implementations are also described and recited herein.

BRIEF DESCRIPTIONS OF THE DRAWINGS

DETAILED DESCRIPTIONS

Figure 1:
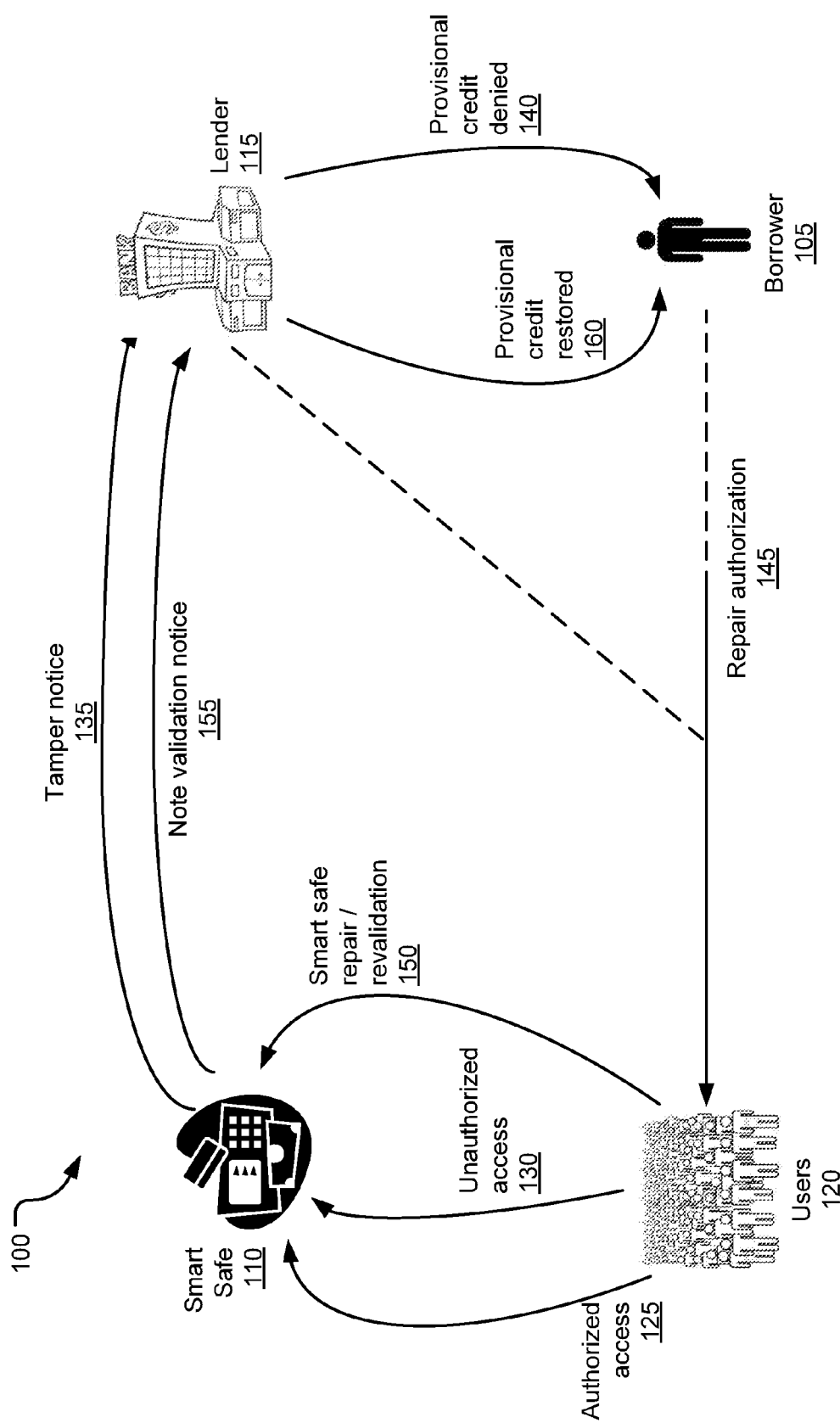
FIG. 1 is a flow diagram illustrating the use of note validator security to control access to a smart safe.

FIG. 1 is a flow diagram 100 illustrating the use of note validator security to control access to a smart safe 110. In order to extend provisional credit to a potential borrower 105 (e.g., a retailer or the retailer's representative(s)), one or more users 120 insert currency and/or other notes into the borrower's smart safe 110 (e.g., at a retail store or other physical location). This is an authorized access 125 to the smart safe 110 under a first level of security. Additional access to the smart safe 110 may not be permitted under the first level of security. For example, the borrower 105 may own a convenience store and the smart safe 110 stores payment received at the convenience store.

The smart safe 110 includes one or more note validators that validate the authenticity, value, and quantity of the inserted notes. The validated notes are stored in secured cassettes within the smart safe 110 and the smart safe 110 transmits information regarding the validated and secured notes to a potential lender 115 (e.g., a bank) associated with the borrower 105. The lender 115 can extend provisional credit to the borrower 105 based on the value of the validated and secured notes as if the notes were actually deposited with the lender 115. The validated and secured notes can then be picked up and delivered to the lender 115 by an authorized user (e.g., the lender's representative, a certified courier, etc.) at a later time. This is also an authorized access 125 to the smart safe 110 under the first level of security.

The smart safe 110 may occasionally fail to operate. In response, a second level of security may be enabled at the smart safe 110 that permits further limited access to the note validator head to diagnose and correct the failure. For example, the note validator may become jammed if paper or other objects that are not of an acceptable size and shape are forced into the note validator. In order to clear such a jam, a user may have to access the validator head (e.g., remove the validator head from the smart safe 110) to perform any necessary repairs (e.g., clearing any paper jams at the note validator) of the smart safe 110. For example, removal of the validator head of the smart safe 110 by authorized persons may be permitted under the second level of security, but not under the first level of security. Therefore, removal of the validator head may be an authorized access 125 to the smart safe 110 if appropriate conditions are met (see below).

In order for the lender 115 to provide provisional credit to the borrower 105 for the validated and secured notes within the smart safe 110, the lender 115 must be assured that the borrower 105 or any other unauthorized users do not have access to the contents of the smart safe 110. Therefore, the borrower 105 or any other unauthorized users may not have access to the interior of the smart safe 110 to perform any repairs that go beyond the second level of security. Further, while the authorized user may have access to the contents of the smart safe 110, the authorized user may typically only be allowed to access the smart safe 110 for the limited amount of time required to open the smart safe 110, retrieve the validated and secured notes stored within the smart safe 110, and close and re-secure the smart safe 110. In one implementation, the level of security granted to the authorized user is a third level of security, which is less secure than the first and second levels of security (e.g., the third level of security allows limited access to the cassette of the smart safe 110).

Typically, the authorized user is required to make an unscheduled visit to the smart safe 110 to perform the necessary repairs should the smart safe 110 fail. However, the authorized user may not always be available to perform the repairs. This may be undesirable because the smart safe 110 is rendered non-functional until the authorized user repairs the smart safe 110. Further, the authorized user may charge the borrower 105 for the unscheduled visit(s) to repair the smart safe 110. It would be useful to provide some or all other users (e.g., the borrower 105 or borrower's representatives) limited access to the interior of the smart safe 110 sufficient to clear common failures of the smart safe (e.g., jamming within the note validator) without allowing access to the verified notes secured within the smart safe 110. This would be an authorized access 125 by the users.

For example, when an error is detected at the note validator, the smart safe 110 is moved from the first level of security to the second level of security. Under the second level of security, the borrower 105 may be given access to remove the note validator head from the smart safe 110 while the cassette, which secures the validated notes within the smart safe 110, remains inaccessible by the borrower 105. Since most note validator paper jams occurs at the note validator head, allowing the retailer 105 limited access to remove the note validator head substantially reduces the frequency that the authorized user is required to repair the smart safe 110.

However, if some or all unauthorized users 125 are given access to remove the note validator head, the top of the cassette is exposed and may be tampered with. For example, an unauthorized user may attempt to take notes from the cassette by feeding the notes back out through the top of the cassette. This is an unauthorized access 130. Upon detection of an unauthorized access 130, the provisional credit granted to the borrower 105 may be withdrawn by the lender 115. As a result, unauthorized users should be prevented or sufficiently discouraged from tampering with the top of the cassette (e.g., by imposing time limits on the second level of security, limiting access under the second level of security to a select one or few individual users, employing tampering detection devices, etc.).

In the flow diagram 100, one of the users 120 accesses the note validator head of the smart safe 110. The smart safe 110 is equipped with a logging mechanism that detects that the validator head has been accessed for maintenance and records time stamps of when the validator head was removed and replaced, the total quantity of time that the validator head has been accessed, the specific error state of the smart safe 110, transaction details of the smart safe 110 prior to validator head removal to facilitate auditing of the smart safe's contents, and/or the identity of the user that accessed the validator head, for example. If the smart safe 110 detects that the access was an unauthorized access 130 and may have resulted in tampering with the smart safe 110 (e.g., if the validator head has been accessed for too long or by an unauthorized user), the smart safe 110 may transmit a tamper notice 135 (including some or all of the logged information) to the lender 115. The lender 115 may send a denial of provisional credit notice 140 to the borrower 105 indicating that provisional credit is denied until the contents of the smart safe 110 are re-verified.

The logged information may be used individually or in combination to determine if the cassette or other components of the smart safe 110 have been tampered with and/or if the lender 115 can no longer guarantee the contents of the smart safe 110. For example, if tampering of the smart safe 110 is suspected, the smart safe 110 may transmit an electronic message to the lender 115 or the borrower 105 (i.e., the tamper notice 135). The lender 115 or the borrower 105 may then send an authorized user to investigate and/or discontinue provisional credit until the contents of the smart safe 110 are re-verified. In one example implementation, the smart safe 110 is configured to transmit if and when the validator head was removed from the smart safe 110, if and when the validator head was in a jammed state, and/or if and when to discontinue and/or restore provisional credit to the borrower 105. Other options may include a tamper seal on the cassette, note validator, and/or access door. Still further, the cassette may be configured to automatically lock itself when the note validator is accessed or removed from the smart safe 110.

The lender 115 and/or the borrower 105 may send a dispatch instruction and repair authorization 145 to the authorized user to investigate the tamper notice at the smart safe 110. The authorized user performs any necessary repair 150 of the smart safe 110 and/or revalidates the contents of the smart safe 110 for provisional credit. The smart safe 110 sends a note validation notice 155 to the lender 115 and the lender 115 restores provisional credit 160 to the borrower 105. The borrower 105 can then use the provisional credit to purchase goods for a retail location associated with the smart safe 110, for example.

Figure 2:
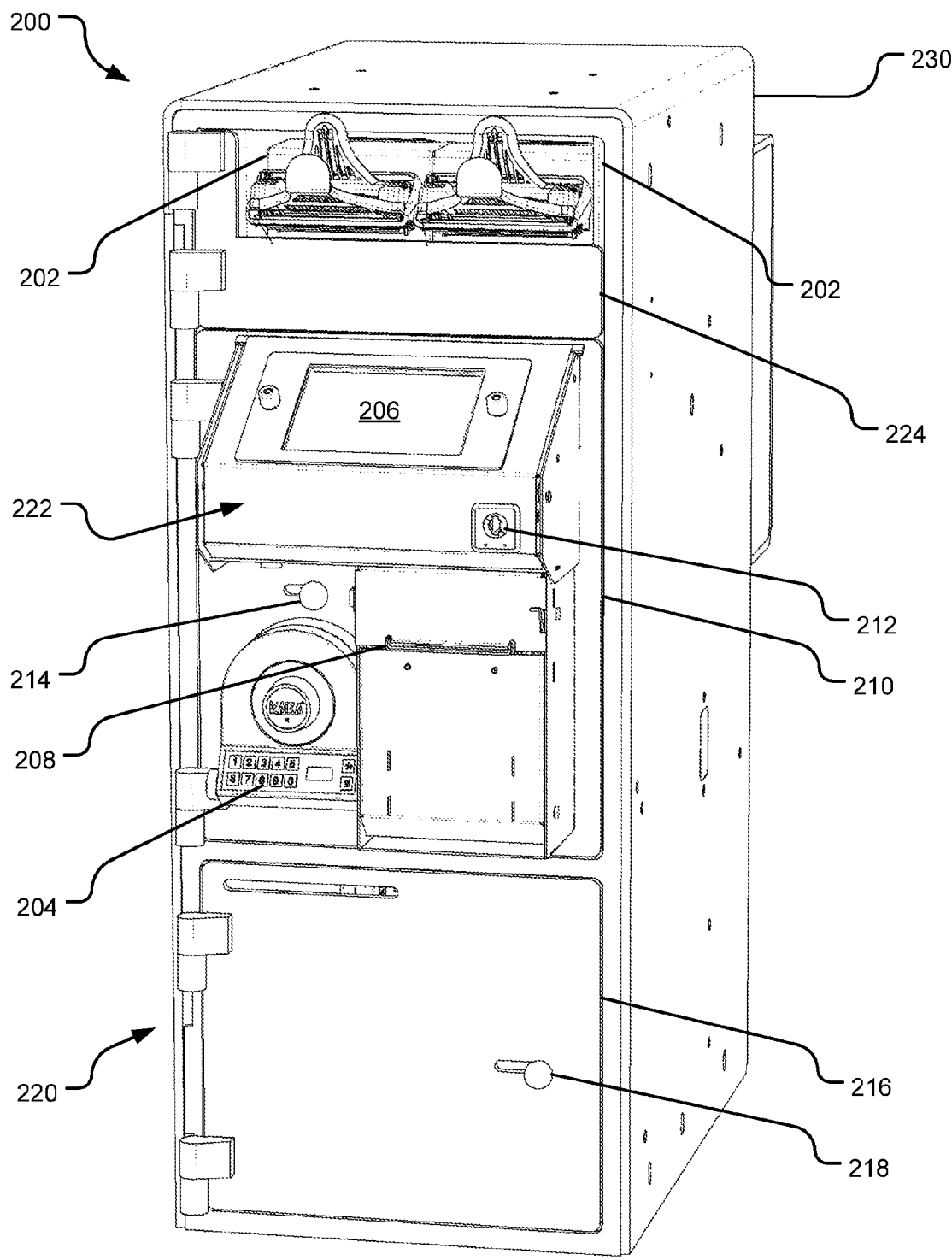
FIG. 2 is a perspective view of an example smart safe with a pair of note validators in a closed orientation.

FIG. 2 is a perspective view of an example smart safe 200 with a with a pair of note validators 202 in a closed orientation. The note validators 202 each have a corresponding cassette (not shown) secured within a smart safe housing 230. A user (not shown) inserts currency or other notes (not shown) into one of the note validators 202 to deposit the notes within the smart safe 200. The note validators 202 each are capable of receiving and determining the value and/or validity (e.g., counterfeit or not) of the notes. If the input notes are valid, the note validators 202 deposit the notes into the cassettes for storage and safekeeping. Further, the note validators 202 track the monetary value of the validated notes and may transmit the validated value of the deposited notes via a transmitter (not shown) either periodically or upon each validation of the notes to a potential lender (e.g., a bank) associated with the smart safe 200.

The smart safe 200 is further equipped with input and output devices (e.g., a touch and display screen 206 and a printer 208) and a computer (not shown) including the data logger 222. The touch screen 206 enables a user to identify himself to the smart safe 200 in order to gain a level of access to the smart safe 200. Identification of the user to the smart safe 200 may also be used to set an appropriate level of security at the smart safe 200

The levels of access may include full access (i.e., access to the note validators 202 and cassettes within the smart safe 200), which may correspond to a third level of security; validator limited access (i.e., access to the note validators 202 only) or validator head limited access (i.e., access to the note validator heads only), one or both of which may correspond to a second level of security; deposit access (i.e., ability to insert notes into the smart safe 200 only), which may correspond to a first level of security; and/or no access to the smart safe 200. Optionally or alternatively, a combination style lock 204 may control access to the smart safe 200.

The display screen 206 may present options to the user in gaining access to the smart safe 200 and provide instructions to the user on how to use the smart safe 200. In some implementations, the touch sensitive display screen 206 can be replaced by a keypad and a display. The printer 208 may provide a receipt to the user indicating an inserted quantity of currency, whether or not the inserted currency is validated, and/or other information. Further, other input and output devices are contemplated herein (e.g., a microphone and voice command recognition input software and/or a speaker audio output). The computer organizes information input from the input device(s) and output to the output device(s).

The reverse side of the touch and display screen 206, the printer 208, the cassettes, the computer, the data logger 222, and communication equipment (not shown) is secured within the smart safe 200 via an access door 210. The access door 210 permits only authorized users (e.g., authorized couriers) access to the interior of the smart safe 200, especially the contents of the cassettes (e.g., verified notes). The authorized users may unlock the access door 210 by entering an access code on the numerical keypad 204 or touch-sensitive display screen 206 and/or by inserting a key into receptacle 212, and/or through use of the lock 204 (all collectively user input devices), for example. Further, a latch 214 may be used to open the access door 210 after it has been unlocked by the authorized user.

The smart safe 200 includes detection circuitry that detects that the access door 210 has been opened, and/or that the note validators 202 have been accessed or removed for maintenance. The data logger 222 logs time stamps of when each of the note validators 202 were accessed, removed, and/or replaced; logs the total quantity of time that each of the note validators 202 were accessed, removed, and/or replaced; logs a record of any specific error states of the smart safe 200, logs transaction details of the smart safe 200 prior to access to one or both of the note validators 202 to facilitate auditing of the smart safe 200 contents, and/or logs the identity of the user that accessed the note validators 202, for example.

If the smart safe 200 detects that an unauthorized access to the smart safe 200 has occurred (e.g., an access outside the bounds of the applicable level of security at the time in question). Such an access may have resulted in tampering with the smart safe 200 (e.g., if the note validators 202 have been accessed for too long or by an unauthorized user) and the smart safe 200 may transmit a tamper notice (including some or all of the logged information) to the lender via the communication equipment or circuitry. Further still, the smart safe 200 may be configured to transmit validation notices periodically to the associated lender and if the lender fails to receive the scheduled notices (e.g., if a user disconnects the communications link to the lender or the communications link fails for some other reason), provisional credit is denied to the borrower associated with the smart safe 200. The logged information may be used individually or in combination to determine if the cassette or other components of the smart safe 200 have been tampered with and/or if the lender can no longer guarantee the contents of the smart safe 200.

The smart safe 200 may also include an auxiliary access door 224 that provides access to the heads of the note validators 202 only. For example, users with validator head limited access (e.g., when the second level of security is active at smart safe 200) may be able to open the auxiliary access door 224 to access the heads of the note validators 202, but not the access door 210 to access other aspects of the smart safe 200. Further, users with validator head limited access may be required to log into the smart safe 200 in order to open the auxiliary access door 224 and remove one or both of the validator heads. Still further, users with validator head limited access may not be allowed to open the auxiliary access door 224 unless an error condition is detected in one or both of the validator heads. The user's identity may be associated with access to the validator heads so that any potential tampering with the smart safe 200 may be attributed to the user that accessed the validator heads via the auxiliary access door 224. Further yet, the detected access information may be logged on an authorized courier's report so that potential of tampering is known at the time the notes are withdrawn from the smart safe 200. In one implementation, the auxiliary access door 224 may not be opened unless the smart safe 200 detects an error condition (e.g., a paper jam in one of the note validators 202).

The smart safe 200 may further include a secured storage area 220 accessible via an access door 216. Further, a latch 218, which may include a locking mechanism, may be used to open the access door 216.

Figure 3:
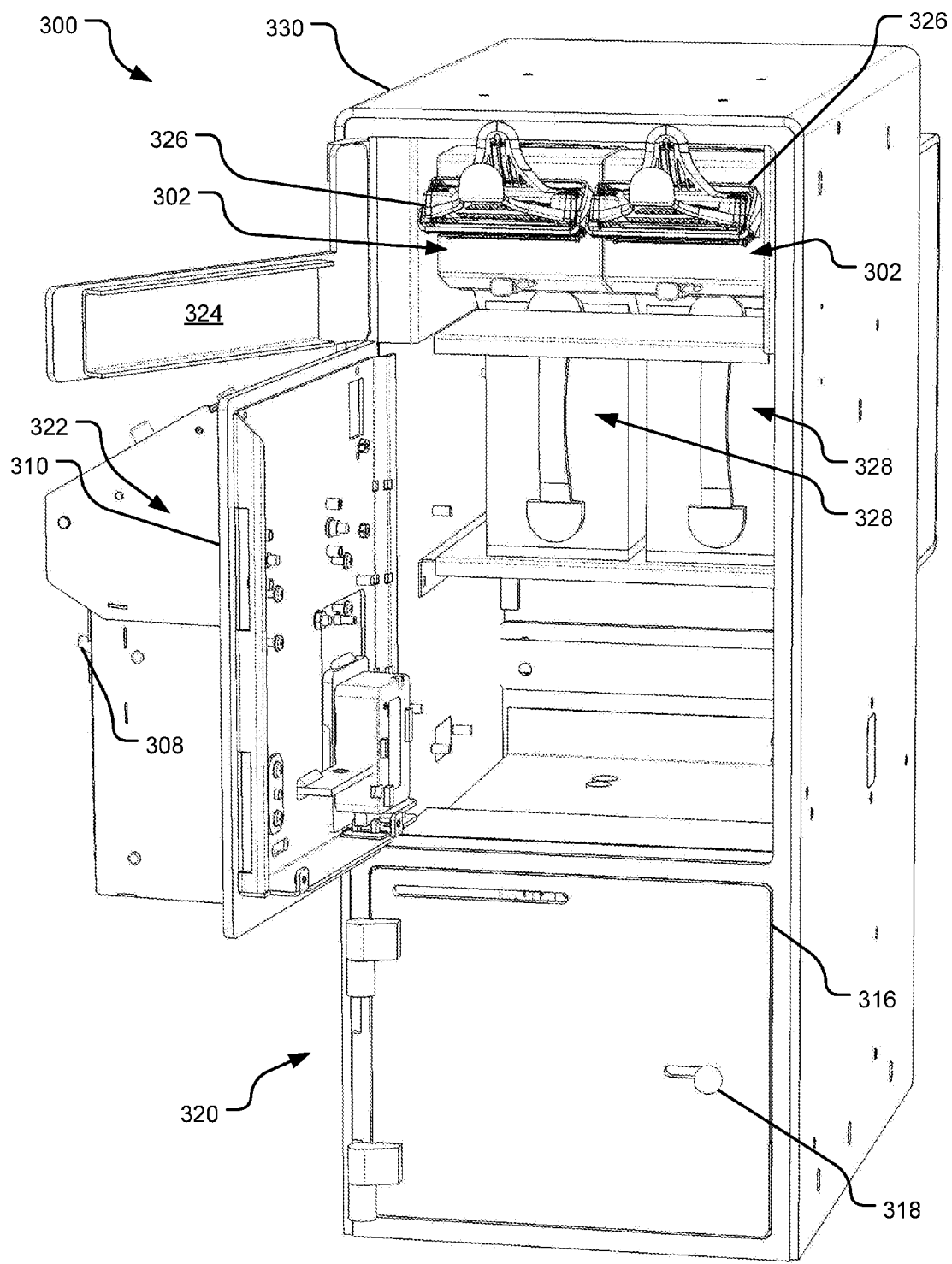
FIG. 3 is a perspective view of an example smart safe with a pair of note validators in an open orientation.

FIG. 3 is a perspective view of an example smart safe 300 with a pair of note validators in an open orientation. The note validators, each with a corresponding note tray (optional) 326, validator head 302, and cassette 328 are secured within a smart safe housing 330. A user (not shown) inserts currency or other notes (not shown) into one of the note validators to deposit the notes within the smart safe 300. The note validators each are capable of receiving and determining the value of the input notes and/or if the input notes are, or are not counterfeit. If the notes are valid, the note validators deposit the notes into the cassettes 328 for storage and safekeeping. Further, the note validators may track the monetary value of the inserted notes and transmit the verified and secured value via a transmitter (not shown) either periodically or upon each validation of the notes to a potential lender (e.g., a bank) associated with the smart safe 300.

The smart safe 300 is further equipped with input and output devices (e.g., a touch screen (not shown), a display screen (not shown), and a printer 308) and a computer (not shown) including the data logger 322. The touch screen enables a user to identify himself to the smart safe 300 in order to gain a level of access to the smart safe 300. Identification of the user to the smart safe 300 may also be used to set an appropriate level of security at the smart safe 300

The levels of access may include full access (i.e., access to the note validators and cassettes within the smart safe 300), which may correspond to a third level of security; validator limited access (i.e., access to the note validators only) or validator head limited access (i.e., access to the note validator heads 302 only), one or both of which may correspond to a second level of security; deposit access (i.e., ability to insert notes into the smart safe 300 only), which may correspond to a first level of security; and/or no access to the smart safe 300.

The touch screen may present options to the user in gaining access to the smart safe 300 and provide instructions to the user on how to use the smart safe 300. In some implementations, a keypad is added to function as an input device. The printer 308 may provide a receipt to the user indicating an inserted quantity of currency, whether or not the inserted currency is validated, and other information. Further, other input and output devices are contemplated herein (e.g., a microphone and voice command recognition input software and/or a speaker audio output). The computer organizes information input from the input device(s) and output to the output device(s).

An interior side of the touch screen, display screen, the cassettes 328, the computer, the data logger 322, and communication equipment may be secured within the smart safe 300 via an access door 310. The access door 310 permits only authorized users (e.g., authorized couriers) access to the interior of the smart safe 300, especially the contents of the cassettes 328 (e.g., the verified notes). The authorized users may unlock the access door 310 by entering an access code on the numerical keypad or touch-sensitive display screen and/or by inserting a key into a receptacle (not shown) (all collectively user input devices), for example. Further, a latch (not shown) may be used to open the access door 310 after it has been unlocked by the authorized user.

The smart safe 300 includes detection circuitry that detects that the access door 310 has been opened and/or that the note validators have been accessed, removed, and/or replaced for maintenance. The data logger 322 logs time stamps of when each of the note validators were accessed, removed, and/or replaced; logs the total quantity of time that each of the note validators were accessed, removed, and/or replaced; logs a record of the specific error state of the smart safe 300, logs transaction details of the smart safe 300 prior to access, removal, and/or replacement of one or both of the note validators to facilitate auditing of the smart safe 300 contents; and/or logs the identity of the user that accessed the note validators 302, for example.

If the smart safe 300 detects an unauthorized access (i.e., an access outside the bounds of the applicable security level at the time of the access), the access may have resulted in potential tampering with the smart safe 300 (e.g., if the note validators have been accessed for too long or by an unauthorized user). The smart safe 300 may then transmit a tamper notice (including some or all of the logged information) to the lender via the communication equipment or circuitry. Further still, the smart safe 300 may be configured to transmit validation notices periodically to the associated lender and if the lender fails to receive the scheduled notices (e.g., if an unauthorized user disconnects that communications link or the communications link becomes otherwise unavailable to the lender), provisional credit is denied to a borrower associated with the smart safe 300. The logged information may be used individually or in combination to determine if the cassettes 328 or other components of the smart safe 300 have been tampered with and/or if the lender can no longer guarantee the contents of the smart safe 300.

The smart safe 300 may also include an auxiliary access door 324 that provides access to the note validator heads 302 only. For example, users with validator head limited access (e.g., under the second level of security) only may be able to open the auxiliary access door 324 to access the note validators heads 302 but not the access door 310 to access other aspects of the smart safe 300. Users with validator head limited access may be required to log into the smart safe 300 in order to open the auxiliary access door 324 and remove one or both of the note validator heads 302. Further, users with validator head limited access may not be allowed to open the auxiliary access door 324 unless an error condition is detected in one or both of the note validator heads 302. The user's identity may be associated with access to the note validator heads 302 so that any potential tampering with the smart safe 300 may be assigned to the user that accessed the note validator heads 302 via the auxiliary access door 324. Further, the detected information may be logged on an authorized courier's report so that potential of tampering is known at the time the notes are withdrawn from the smart safe 300. In one implementation, the auxiliary access door 324 may not be opened unless the smart safe 300 detects an error condition (e.g., a paper jam in one of the note validator heads 302).

The smart safe 300 may further include a secured storage area 320 accessible via an access door 316. Further, a latch 318, with or without a locking mechanism, may be used to open the access door 316.

Figure 4:
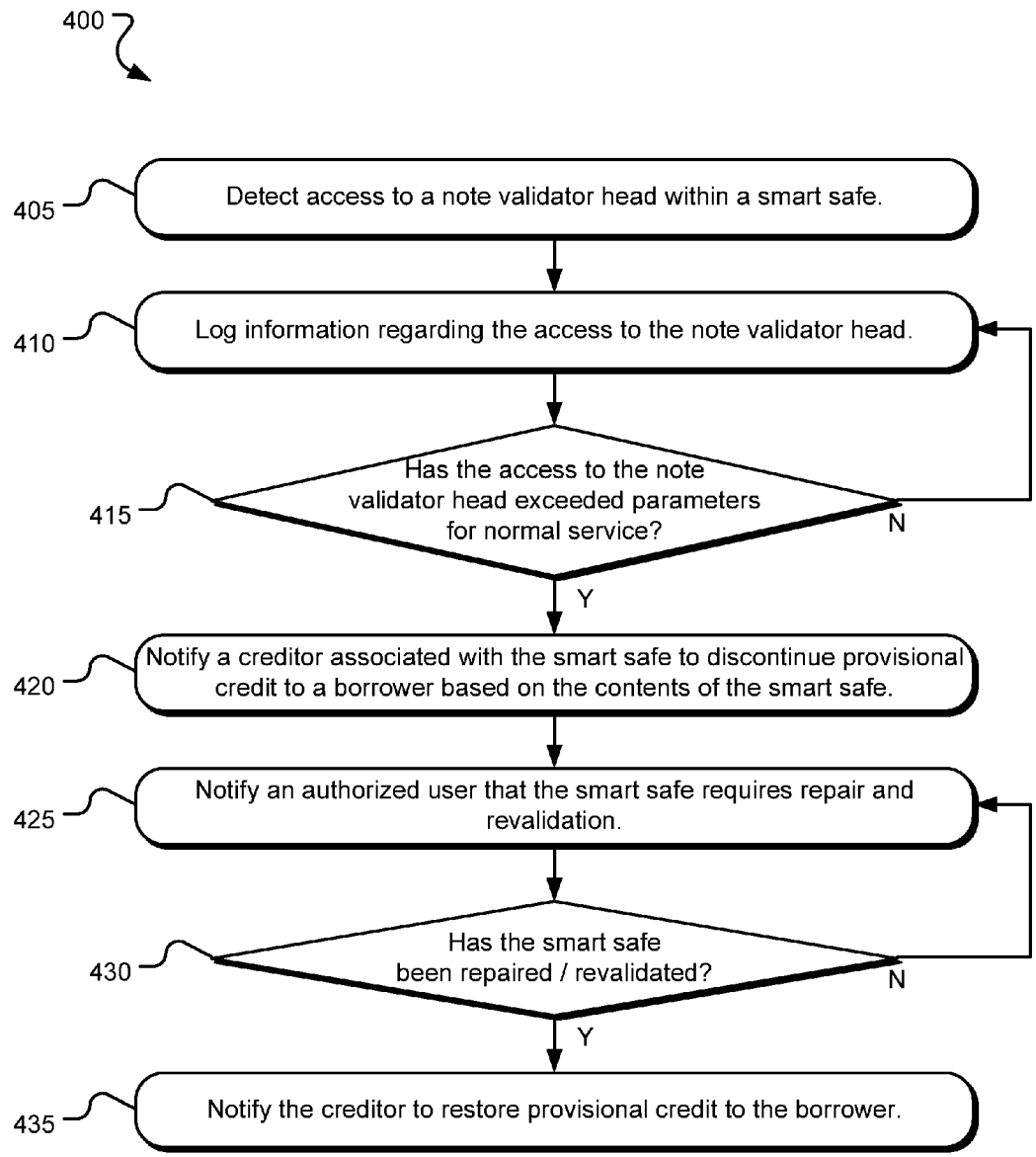
FIG. 4 illustrates example operations for using note validator security to detect and address improper access to a smart safe.

FIG. 4 illustrates example operations 400 for using note validator security to detect and address improper access to a smart safe. A detecting operation 405 detects access to a note validator head within a smart safe. The detecting operation 405 may be performed by various sensors located on access doors that provide access to the note validator and on the note validator itself. A logging operation 410 logs information regarding the access to the note validator head. Example logged information includes time stamps of when each of the note validators were removed and replaced, the total quantity of time that each of the note validators were accessed, a record of the specific error state of the smart safe, transaction details of the smart safe prior to removal of one or both of the note validators to facilitate auditing of the smart safe contents, and/or the identity of the user that accessed the note validators.

A decision operation 415 determines whether the access to the note validator head has exceeded parameters for normal service of the note validator head. For example, if the note validator head was removed and the note validator was not in a jammed state, access has exceeded parameters for normal service. If the access to the note validator head has not exceeded parameter for normal service of the note validator head, logging operation 410 continues to log information regarding the access to the note validator head.

If the access to the note validator head has exceeded parameter for normal service of the note validator head, notification operation 420 notifies a lender (e.g., a bank) associated with the smart safe to discontinue provisional credit to a borrower (e.g., a retailer) based on the contents of the smart safe. Notification operation 420 occurs because the contents of the smart safe can no longer be guaranteed due to the logged information. Further, a second notification operation 425 notifies an authorized user that the smart safe requires repair and/or revalidation of its contents. The authorized user may physically come and inspect the condition and contents of the smart safe and repair and/or revalidate it for use.

Decision operation 430 determines if the smart safe has been repaired and/or revalidated by the authorized user. If not, notification operation 425 may repeat to notify the authorized user that the smart safe has not yet been repaired and/or revalidated. When the smart safe has been repaired and/or revalidated by the authorized user, notification operation 435 notifies the creditor to restore provisional credit to the borrower based on the revalidated value of notes stored within the smart safe.

Figure 5:
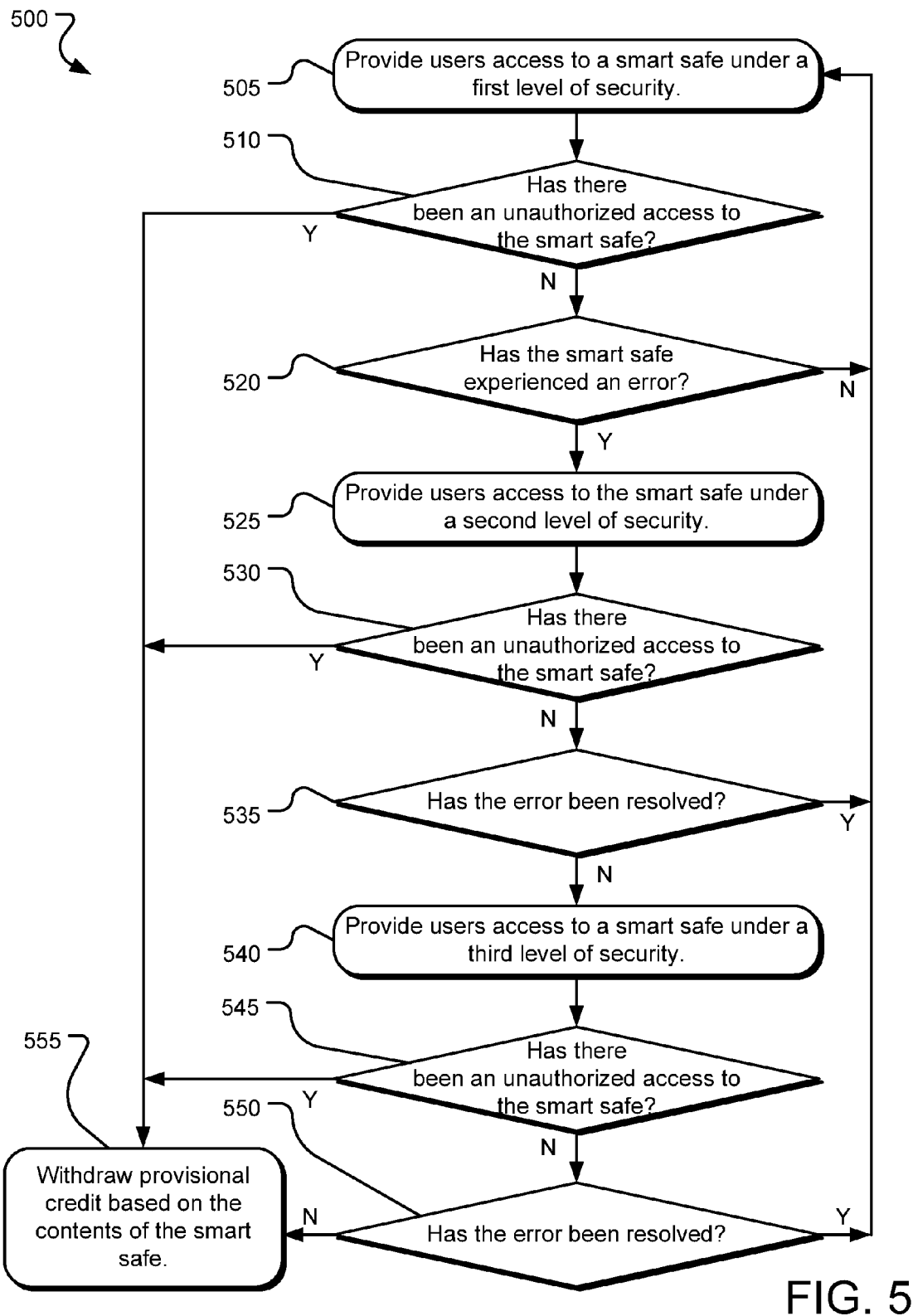
FIG. 5 illustrates example operations for using varying security levels to control access to a smart safe.

FIG. 5 illustrates example operations 500 for using varying security levels to control access to a smart safe. A providing operation 505 provides users access to a smart safe under a first level of security. The first level of security allows users to deposit notes within the smart safe by inserting them into a note validator associated with the smart safe, for example. The first level of access may not permit any additional access to internal components of the smart safe. The note validator validates the authenticity of the inserted notes and reads the value of the inserted notes. The validated notes are deposited within the smart safe and the total value of the deposited notes is tracked. Provisional credit may be extended to a borrower from a lender based on the validated and secured value of notes stored within the smart safe.

Decision operation 510 determines if an unauthorized access to the smart safe has occurred. For example, an unauthorized access is any access to the smart safe that exceeds that permitted by the first level of security unless the accessing user has entered an access code that overrides the first level of security (e.g., a certified courier opening the smart safe to remove cassettes storing the deposited notes). This may include any access to the note validator heads in addition to that required to insert notes within the note validator heads.

If no unauthorized access is detected, decision operation 520 determines if the smart safe has experienced an error. While the smart safe may potentially experience a variety of error types, a common error type is a jam at the note validator. This may occur due to a user inserting objects into the note validator that it is not designed to accept (e.g., coins). So long as there are no detected errors or unauthorized access, operation 505 continues to provide the users access to the smart safe under the first level of security.

If decision operation 520 determines that the smart safe is experiencing an error, providing operation 525 provides users access to the smart safe under a second level of security. The second level of security allows one or more users limited access to the internal workings of the smart safe. For example, a user may be permitted to remove the note validator head in an attempt to clear a jam at the note validator head. Such access under the second level of security may be time limited (e.g., the user may only have the note validator head removed from the smart safe for a predetermined amount of time before the user's access becomes unauthorized) or user limited (e.g., an access code and/or user identification may be required to enable the second level of security), for example.

Decision operation 530 determines if an unauthorized access to the smart safe has occurred. For example, an unauthorized access is any access to the smart safe that exceeds that permitted by the second level of security unless the accessing user has entered an access code that overrides the second level of security. This may include any access to the interior of the smart safe beyond accessing the note validator heads.

If no unauthorized access is detected, decision operation 535 determines if the detected error has been resolved. For example, a user may have accessed a jammed note validator head under the second level of security and cleared the jam, thus resolving the error. If the error has been resolved, operation 505 resumes providing the users access to the smart safe under the first level of security.

If decision operation 535 determines that the smart safe is still experiencing an error, providing operation 540 provides users access to the smart safe under a third level of security. The third level of security allows one or more users greater access to the internal workings of the smart safe. For example, a service technician may be permitted to disassembly components of the smart safe so long as the cassettes storing the validated notes remain undisturbed. Such access under the third level of security may be time limited or user limited, for example.

Decision operation 545 determines if an unauthorized access to the smart safe has occurred. For example, an unauthorized access is any access to the smart safe that exceeds that permitted by the third level of security unless the accessing user has entered an access code that overrides the third level of security. This may include access that risks compromising the integrity of the secured notes within the cassettes of the smart safe.

If no unauthorized access is detected, decision operation 550 determines if the detected error has been resolved. For example, the service technician may have repaired the smart safe, thus resolving the error. If the error has been resolved, operation 505 resumes providing the users access to the smart safe under the first level of security. If the error condition is not resolved, operation 555 may withdraw provisional credit based on the contents of the smart safe. Further, if any of decision operations 510, 530, or 545 determine that an unauthorized access has occurred, operation 555 withdraws provisional credit based on the contents of the smart safe. This is because the content of the smart safe are no longer verified. An authorized user may then be sent to revalidate the contents of the smart safe so that provisional credit may be restored.

Figure 6:
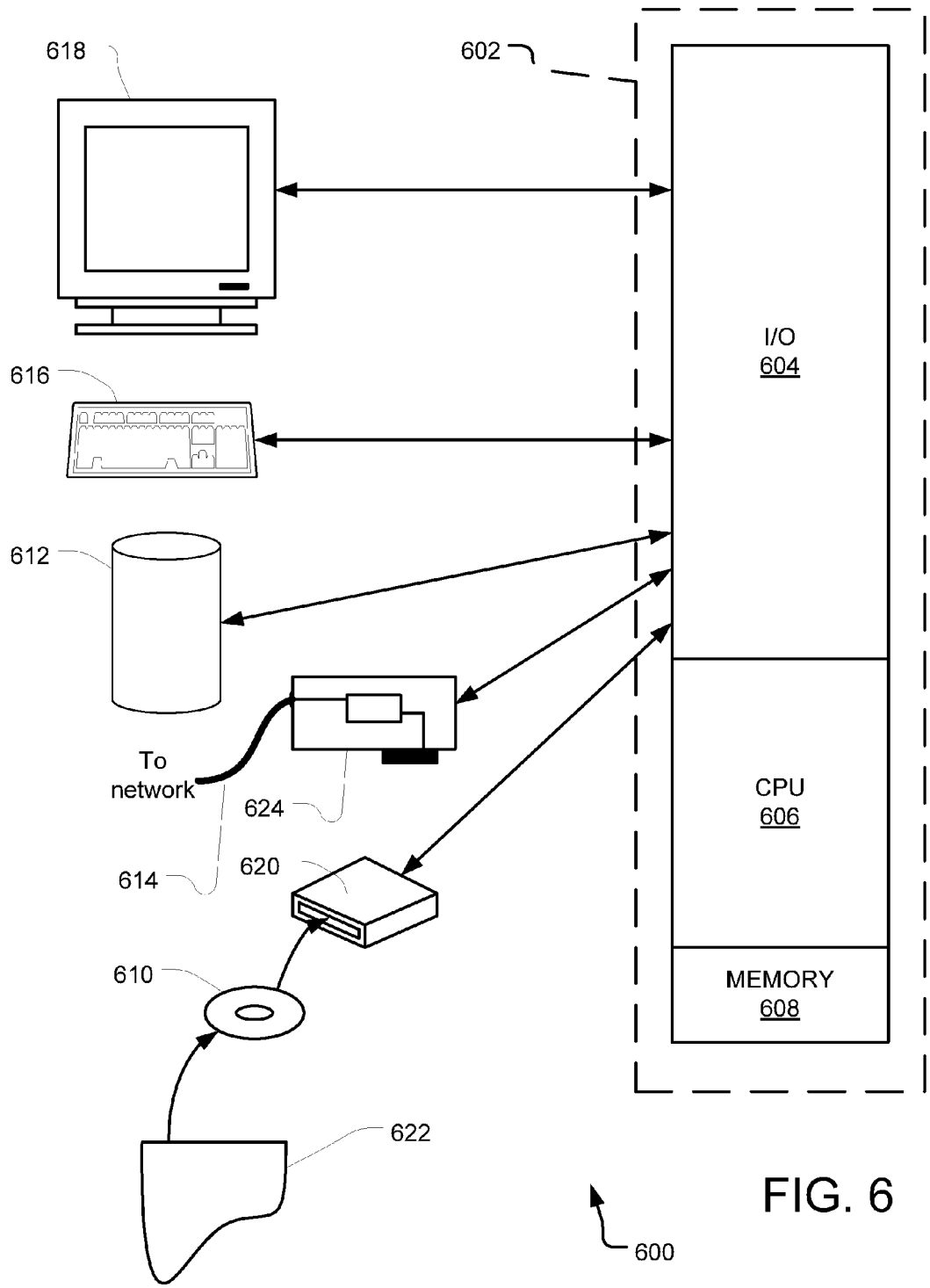
FIG. 6 illustrates an example computing system that can be used to implement the described technology.

FIG. 6 illustrates an example computing system that can be used to implement the described technology. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 to a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 604, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In an example implementation, the one or more user-interface devices (e.g., a keyboard 616 and a display unit 618) may be incorporated into the smart safes 200, 300 of FIGS. 2 and 3. Further, the processor 602 with the input/output (I/O) section 604, Central Processing Unit (CPU) 606, and memory section 608 may include the data loggers 222, 322 of FIGS. 2 and 3.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order and may not include all the described logical operations, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of providing access to a note validator head of a smart safe comprising:
   providing deposit access to the note validator head using a processor;
   detecting an error condition at the note validator head using detection circuitry;
   providing limited maintenance access to the note validator head using the processor responsive to detecting the error condition, wherein limited maintenance access allows access to and removal of the note validator head from the smart safe to correct the error condition; and
   revoking a validated note value within the smart safe if a duration of the limited maintenance access exceeds a maximum duration.

2. The method of claim 1, further comprising:
   transmitting a notice of validated note value within the smart safe;
   detecting an unauthorized access to the smart safe; and
   transmitting a notice that the note value is no longer validated responsive to detecting the unauthorized access to the smart safe.

3. The method of claim 1, further comprising:
   detecting that the error condition is resolved using the detection circuitry; and
   providing the deposit access to the note validator head responsive to detecting that the error condition is resolved.

4. The method of claim 1, wherein the limited maintenance access permits access to the note validator head not available under the deposit access.

5. The method of claim 1, further comprising:
   receiving an access authorization;
   providing additional maintenance access to the smart safe responsive to receipt of the access authorization.

6. The method of claim 5, further comprising:
   monitoring a duration of the additional maintenance access to the smart safe using a data logger.

7. The method of claim 5, wherein the additional maintenance access permits access not available under the deposit access and the limited maintenance access.

8. The method of claim 1, further comprising:
   logging information regarding access to the note validator head using a data logger; and
   transmitting the logged information.

9. The method of claim 8, wherein the logged information includes at least one of a time stamp of when the note validator head was removed from the smart safe, a time stamp of when the note validator head was reattached to the smart safe, a length of time that the note validator head was removed from the smart safe, and identification of a user that removed the note validator head from the smart safe.

10. The method of claim 1, wherein the error condition is a jam at the note validator head.

11. The method of claim 1, wherein the deposit access allows a user to utilize the note validator head to receive and validate notes.

12. The method of claim 5, wherein the additional maintenance access allows a user to access internal components of the smart safe.

13. A smart safe comprising:
   a note validator including a note validator head;
   a computer that provides deposit access to the note validator head; and
   detection circuitry that detects an error condition at the note validator head, wherein the computer provides limited maintenance access to the note validator head responsive to detecting the error condition wherein limited maintenance access allows access to and removal of the note validator head from the smart safe to correct the error condition, wherein the computer monitors a duration of the limited maintenance access and revokes a validated note value within the smart safe if a duration of the limited maintenance access exceeds a maximum duration.

14. The smart safe of claim 13, further comprising:
   communication circuitry that transmits a notice of validated note value within the smart safe, wherein the detection circuitry further detects an unauthorized access to the smart safe and wherein the communication circuitry further transmits a notice that the note value is no longer validated responsive to detecting the unauthorized access to the smart safe.

15. The smart safe of claim 13, wherein the detection circuitry further detects that the error condition is resolved and the computer further provides the deposit access to the note validator head responsive to detecting that the error condition is resolved.

16. The smart safe of claim 13, wherein the limited maintenance access permits access to the note validator head not available under the deposit access.

17. The smart safe of claim 13, further comprising:
   a user input device that receives an access authorization from a user, wherein the computer further provides additional maintenance access to the smart safe responsive to receipt of the access authorization.

18. The smart safe of claim 17 wherein the computer further monitors a duration of the additional maintenance access to the smart safe and revokes a validated note value within the smart safe if the duration of the additional maintenance access exceeds a maximum duration.

19. The smart safe of claim 17, wherein the additional maintenance access permits access not available under the deposit access and the limited maintenance access.

20. The smart safe of claim 13, wherein the computer further logs information regarding access to the note validator head, further comprising:
   communication circuitry that transmits the logged information.

21. The smart safe of claim 20, wherein the logged information includes at least one of a time stamp of when the note validator head was removed from the smart safe, a time stamp of when the note validator head was reattached to the smart safe, a length of time that the note validator head was removed from the smart safe, and identification of a user that removed the note validator head from the smart safe.

22. The smart safe of claim 13, wherein the error condition is a jam at the note validator head.

23. The smart safe of claim 13, wherein the deposit access allows a user to utilize the note validator head to receive and validate notes.

24. The smart safe of claim 17, wherein the additional maintenance access allows the user to access internal components of the smart safe.

25. One or more computer-readable storage media not embodied within a signal encoding computer-executable instructions for executing on a computer system a computer process that provides access to a note validator head, the computer process comprising:

providing deposit access to the note validator head using a processor;

detecting an error condition at the note validator head of a smart safe; and providing limited maintenance access to the note validator head using the processor responsive to detecting the error condition, wherein limited maintenance access allows access to and removal of the note validator head from the smart safe to correct the error condition; and revoking a validated note value within the smart safe if a duration of the limited maintenance access exceeds a maximum duration.

26. The method of claim 1, wherein the limited maintenance access to the note validator head is automatically provided in response to detecting the error condition using the processor.

27. The smart safe of claim 13, wherein the limited maintenance access to the note validator head is automatically provided in response to detecting the error condition using the computer.

* * * * *